United States Patent [19]

Melton et al.

[11] Patent Number: 5,757,488

[45] Date of Patent: May 26, 1998

[54] OPTICAL FREQUENCY STABILITY CONTROLLER

[75] Inventors: David L. Melton, Ft. Wayne; Norman H. Macoy, Ft. Wayne; Ron J. Glumb, Fort Wayne, all of Ind.; Martin Chamberland, Quebec; Jean Giroux, Sainte-Foy, both of Canada

[73] Assignee: ITT Industries, Inc., White Plains, N.Y.

[21] Appl. No.: 728,563

[22] Filed: Oct. 10, 1996

[51] Int. Cl.$^6$ .................................... G01B 9/02
[52] U.S. Cl. .................... 356/346; 356/243; 356/357
[58] Field of Search .......................... 356/346, 243, 356/357

[56] References Cited

U.S. PATENT DOCUMENTS

| | | |
|---|---|---|
| 4,165,183 | 8/1979 | Hall et al. .................... 356/346 |
| 4,874,223 | 10/1989 | O'Meara .................... 356/346 |
| 5,110,211 | 5/1992 | Niki et al. .................... 356/346 |
| 5,245,408 | 9/1993 | Cohen .................... 356/346 |
| 5,302,823 | 4/1994 | Franklin et al. . |
| 5,373,515 | 12/1994 | Wakabayashi et al. .................... 356/346 |
| 5,402,227 | 3/1995 | Schuma . |

*Primary Examiner*—Frank G. Font
*Assistant Examiner*—Jason D. Vierra-Eisenberg
*Attorney, Agent, or Firm*—Plevy & Associates

[57] ABSTRACT

The present invention is a method for calibrating power spectral data obtained with an interferometer based Fourier transform spectrometer which utilizes a laser based coherent radiant source as the metrology source. A radiant beam of predetermined wavelength from a neon lamp based noncoherent radiant source is directed in parallel with a radiant beam from the laser source into the interferometer to create a laser based interference pattern and a neon lamp based interference pattern. Distinct fringe counts are derived from the laser based interference pattern and the neon lamp based interference pattern. The wavelength of the laser source is determined based on a correlation between the known wavelength of the neon lamp based interference pattern and the determined fringe counts. The scale of the power spectral data is calibrated based on the determined wavelength of the laser source.

28 Claims, 2 Drawing Sheets

OPTICAL FREQUENCY STABILITY CONTROLLER

FIELD OF THE INVENTION

This invention relates to spectrometers and more particularly to the use of optical frequency counting to stabilize a laser source required in an interferometer based spectrometer for space based scanning.

BACKGROUND OF THE INVENTION

A spectrometer, generally speaking, is an instrument for measuring the positions of spectral lines which are isolated peaks of intensity in a spectrum. The present invention, in particular, pertains to a Fourier transform infrared (FTIR) spectrometer based on the known Michelson interferometer configuration. The purpose of the present invention is to measure radiance from the earth's atmosphere in many different spectral channels. The spectrometer's sensor is mounted on a satellite and looks down at the earth and collects the energy radiated from the earth and its atmosphere. The current operational technique for space based spectral data measuring is limited to 20 spectral channels. In contrast, the present method based on the Michelson interferometer can attain 2000 spectral channels. Moreover, the present invention improves upon known techniques by providing greater spectral resolution of each channel. Respecting wavelength stability, the present invention is highly stable in that the channel wavelength does not shift or drift with time or environmental conditions. Since the interferometer's measurement is much more sensitive to changes in spectral wavelength of the atmosphere, wavelength stability in the metrology laser source is very important. Current methods that are stable in wavelength are limited in operating life, and current methods that utilize long operating life techniques are unstable in wavelength. The present invention provides both stable wavelength operation and long operating life.

The Michelson interferometer is utilized for precise measurements of wavelength or energy distribution in a heterogenous beam of radiation based on an interference pattern of "fringes" formed. The principles of Michelson two beam interferometry are applied for spectroscopy, especially in the infrared region. The great luminosity of the Michelson based interferometer is combined with the advantage of a photographic spectrograph in that the whole spectrum is under observation at once. The recorded result is the Fourier transform of the desired spectrum.

In a FTIR spectrometer based on the Michelson interferometer, a laser is used as the metrology source. Knowledge of the wavelength of the laser source permits proper scaling of infrared power spectral density (IR PSD) data obtained by the FTIR spectrometer. There are different approaches to measure the wavelength of the metrology laser. One method is to use the IR PSD and to look for the presence of spectral lines of known gas lines. With knowledge of the wavelength for these known gas lines, it is possible to deduct the wavelength of the metrology laser and to calculate the IR PSD. The resolution attainable with this measurement approach is dependent on the gas pressure and the resolution of the instrument. In some field situations this approach is not suitable. A second approach employs making a calibration measurement using the spectrometer. Using a pointing mirror and by looking into a gas cell or at a lamp, i.e., a neon lamp, the acquired spectrum can be used to deduct the wavelength of the metrology laser and used to calibrate subsequent measurements.

If the wavelength of the metrology source is stable and known, the calibration factor of the wavenumber scaling is constant. Hence, stabilizing the wavelength of the metrology laser is a viable approach to proper scaling of the power spectral density data. Depending on the stability required, many approaches can be used. Classical setup using absorption through a gas cell or photogalvanic effect can be used to stabilize the wavelength of the laser source.

Interferometer type spectrometers for space based scanning require a reference source with a long operating life. Helium Neon (HeNe) based laser devices, which consume much greater power relative to solid state laser sources, are unsuitable for such long term space based scanning applications because of the limited power availability on satellites. Moreover, another disadvantage of HeNe gas lasers for long term space use is the potential for gas leakage of the plasma tube at the intersection of the Brewster angle windows in the glass bore. The laser source utilized must be either extremely stable in frequency, about 10 parts per million, or knowledge of the output frequency of the laser source must be maintained. As a result, preference for a laser source lies with solid state laser diodes. However, the main disadvantage of the solid state diode resides in the existence of thermal detuning and instability of the emitting junction layer which is a function of driver current density.

The prior art does not disclose the use of a secondary radiant source with discernable spectral lines at known wavelengths to measure the wavelength of the metrology laser source using the interferometer. U.S. Pat. No. 5,302,823, entitled "Satellite solar band calibration source target apparatus", issued Apr. 12, 1994 to Franklin et al., discloses the use of an off-axis collimator to periodically monitor the optoelectronic performance of a radiometer. The off-axis collimator is comprised of a single axis paraboloidal mirror, a broadband radiant energy source housed in an integrating sphere, detectors for monitoring the performance of the broadband radiant energy source, and a housing for the collimator. U.S. Pat. No. 5,402,227, entitled "High Resolution Multiple Channel Imaging Spectrometer", issued Mar. 28, 1995 to Schuma, discloses a high resolution multiple channel imaging spectrometer employing a pair of reflective gratings to create and separate, respectively, a spectrum of discrete spectral channels having high throughput and good channel isolation.

Accordingly, it is an object of the present invention to provide a method for accurately determining the wavelength of a metrology source and stabilizing the metrology laser source based on the determined wavelength.

SUMMARY OF THE INVENTION

The present invention is a method for calibrating power spectral data derived by an interferometer based Fourier transform spectrometer which utilizes a coherent radiant source, i.e. laser, as the metrology source. A radiant beam of predetermined wavelength from a noncoherent radiant source, preferably a neon lamp, is directed along with a radiant beam from the coherent radiant source, preferably a laser, into the interferometer to create a noncoherent radiant source based interference pattern and a coherent radiant source based interference pattern.

A coherent radiant source based fringe pattern is derived from the coherent radiant source based interference pattern and a noncoherent radiant source based fringe pattern is derived from the noncoherent radiant source based interference pattern. The wavelength of the laser source is determined based on the correlation between the known wavelength of the noncoherent radiant source based fringe pattern and the fringe patterns derived from both the coherent and noncoherent radiant sources. The scale of the power spectral data is calibrated based on the determined wavelength of the laser source.

In a preferred embodiment, the coherent radiant or laser based interference pattern is split by a polarization beam splitter to create a dephase signal which facilitates detecting the directional movement of the interferometer, and create a fringe signal which facilitates determining the fringe counts from the coherent radiant source based fringe pattern. The noncoherent radiant or neon lamp based interference pattern is split by a non-polarizing beam splitter to create a zero path difference location signal which is utilized by the interferometer at each startup, and create a fringe signal that impinges a filter which is preselected to pass a predetermined narrow spectral line shape. The relationship between the wavelength of and fringe counts from the laser based interference pattern and the wavelength of and fringe counts from the neon lamp based interference pattern is utilized to determine the unknown wavelength of the laser source.

BRIEF DESCRIPTION OF THE DRAWINGS

The invention will be better understood with reference to the following illustrative and non-limiting drawings, in which like elements are like referenced.

DETAILED DESCRIPTION OF THE INVENTION

Although the present invention can be used in many different applications where interferometric based spectral measurements are useful, the present invention is especially suited for use in space based spectral scanning applications.

Accordingly, the present invention will be described in its application as an interferometric based direct wavelength measurement device for calibrating, by an optical frequency counting technique, a variable wavelength solid state laser diode source.

Figure 1:
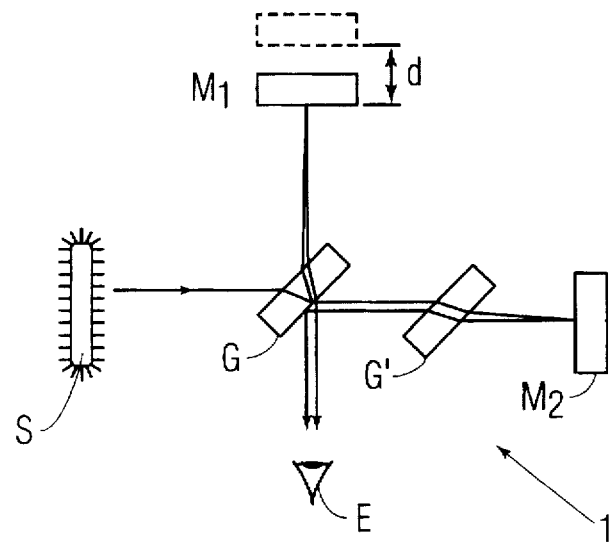
FIG. 1 is a schematic of a known Michelson based interferometer for measuring the wavelength of radiation in the visible spectrum.

As illustrated by the FIG. 1 schematic of a known Michelson interferometer configuration, a two-beam interference is employed in the practical comparison of two optical paths. A light beam from an extended source S is split by a rear semi-silvered flat mirror G at an angle of $\pi/4$ into two beams normal to one another. The direct beam passes through a compensating plate G' parallel to G. The beams are reflected back to G by flat Mirrors, $M_1$ and $M_2$, one of which is mounted from translation in the direction G to M, and are viewed from a direction normal to the original direction of incidence. If the one mirror and the image of the other in G are nearly parallel and the optical paths G to $M_1$ to G and G to $M_2$ to G are nearly equal, white light fringes may be seen. The occurrence of these white light fringes, including an obvious central dark one, on account of a different phase shift at G, is a convenient indicator of path equality. The greater the difference of the paths, the more nearly monochromatic the light must be for observing any fringes. If the fringes shift on account of the displacement of $M_1$, since the path difference between successive bright fringes is $\lambda/2$, where $\lambda$ is the wavelength of the light source, the passage of one bright fringe to the position previously occupied by the adjacent fringe implies the translation of $M_1$ by a distance $\lambda/4$ in the direction G to $M_1$. Hence, knowledge of the wavelength ($\lambda$) can be determined from the fringe patterns.

The principles of two-beam interferometry, noted in the above discussion of the Michelson interferometer, are applied for spectroscopy, especially in the infrared region.

The great luminosity of the Michelson based interferometer is combined with the advantage of a photographic spectrograph in that the whole spectrum is under observation at once. The recorded result is the Fourier transform of the desired spectrum. The interferometer arrangement in FIG. 1 is modified with corner-cube reflectors for mirrors $M_1$ and $M_2$. Mirror $M_2$ is moved slowly along the optical axis at a constant rate, and an aperture is used with the source S. A photodetector placed at the eye position E records the Fourier transform of the spectrum as a function of time.

In a FTIR spectrometer based on the Michelson interferometer, a laser is used as the metrology source. The known wavelength of the metrology laser is used to calibrate the scale of the infrared (IR) power spectral density (PSD) produced by the FTIR spectrometer. The laser based interferometer produces a sinusoidal signal that is used to sample the IR interferogram produced by the interferometer. The sampling period is given by $\lambda$, where $\lambda$ is the laser wavelength. The power spectrum density of the IR signal is given as the Fourier transform of the sampled interferogram. The wavenumber scaling for the power spectrum density is calculated from the laser wavelength ($\lambda$).

The present invention discloses using a noncoherent radiant source, i.e., a neon lamp, to measure the wavelength of the coherent radiant source, i.e., a laser, using the interferometer. The measured wavelength is then used to adjust the laser operating parameters to keep its wavelength at a desired value, or send this measured value to auxiliary data to calibrate the calculated power spectral density (PSD) data. Moreover, the interferometer configuration of the present invention further provides the advantage of using the neon lamp to determine the wavelength of the metrology laser and search for the zero path difference (ZPD) location.

Figure 2:
FIG. 2 is a spectral line shape of radiation emitted by a neon lamp utilized in accordance with the present invention.

In a preferred embodiment of the present invention, the neon lamp is driven by known circuit techniques and exhibits optical power output which linearly correlates to both current draw and power draw in the neon lamp. The neon lamp produces numerous spectral lines which can be utilized to make a calibration determination. In the present invention, the preferred neon lamp produces a spectral line with strong output power at 703 nanometers. However, the neon lamp produces other spectral lines that can be used in lieu of the spectral line at 703 nanometers, i.e., spectral lines with sufficient power output at approximately 633 nanometers and 725 nanometers. The neon lamp preferably produces a very narrow spectral line width 21, as shown in FIG. 2, at the wavelength of interest. A very narrow spectral line width 21, which is more readily discernable from other spectral measurement data, can be more precisely passed through a filter.

With the use of a Michelson interferometer, one can use the interferometer to compare the wavelength of a coherent radiant source such as a laser 32 with the known wavelength of a secondary noncoherent radiant source. In the preferred embodiment, the secondary noncoherent radiant source is a neon lamp 33. The radiation from the neon lamp 33 is directed in the interferometer with the radiation from the metrology laser 32. The interferograms from the filtered neon lamp and the metrology lasers are sinusoidal. During a calibration scan, or a normal scan, counters are used to count the number of fringes from both sources.

Figure 3:
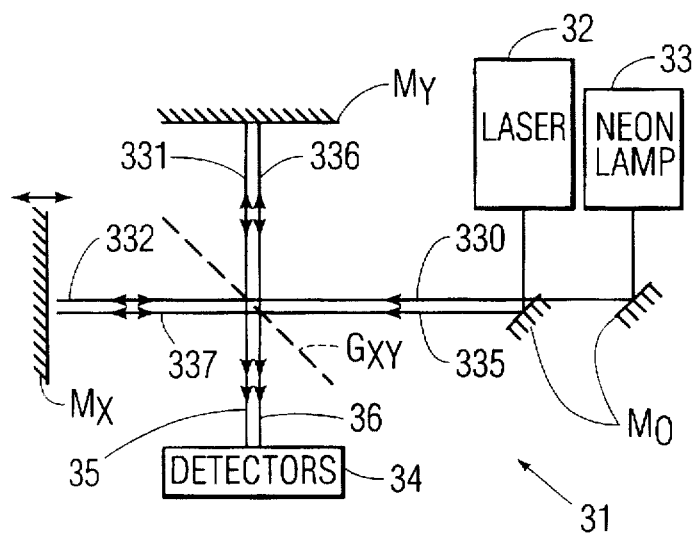
FIG. 3 is a schematic of the present invention application of the interferometer with a neon lamp to measure the wavelength of the metrology laser source in a Fourier transform infrared (FTIR).

Referring now to FIG. 3, there is shown a schematic 31 of an FTIR interferometer based spectrometer utilizing a neon lamp 33 to measure the wavelength of the metrology laser source 32 in accordance with the present invention. Radiation from the neon lamp 33 is directed into the optical path in parallel with the laser 32 generated beam. The radiation beams from both radiant sources trace parallel optical paths from the corner mirrors $M_O$ through the beamsplitter mirror $G_{XY}$ which creates two optical paths, which diverge and converge, resulting in a two-beam interference observable at the detectors 34. In particular, each radiant beam is partially split by mirror $G_{XY}$ to follow one path to reflecting mirror $M_Y$ and reflected back to mirror $G_{XY}$, and partially directed through mirror $G_{XY}$ to reflecting mirror $M_X$ and back to mirror $G_{XY}$, where the split beams converge to form distinct two-beam interferences observable at the detectors 34.

As noted from the above discussion pertaining to FIG. 3, the radiation beam 335 from the laser source 32 is separated at the beamsplitter mirror $G_{XY}$ into two beams, 336 and 337, which travel different optical paths, are reflected back from mirrors $M_Y$ and $M_X$, respectively, and converge at mirror $G_{XY}$ to form a laser based interference pattern 36 which impinges on the detectors 34. Likewise, the radiation beam 330 from the neon lamp 33 is separated at the beamsplitter mirror $G_{XY}$ into two separate beams, 331 and 332, which travel different optical paths, are reflected back from mirrors $M_Y$ and $M_X$, respectively, and converge at mirror $G_{XY}$ to form a neon lamp based interference pattern 35 which impinges the detectors 34. Unless the two paths are of identical optical length, the split beams which rejoin or converge, beams 331 and 332 for the neon lamp and beams 336 and 337 for the laser, may be in phase, and can destructively interfere at some points which appear dark, and constructively interfere at other points which appear bright. These interference or patterns are sensed by the detectors 34 to facilitate production of the interferograms. Preferably, the detectors 34 are optical based silicon detectors whose structure and operating characteristics relevant to the present invention are well known in the art and need not be disclosed in detail herein. The detectors 34 are utilized to ascertain the fringe patterns, i.e., fringe counts, $N_{lamp}$, for the lamp based interference pattern 35 from the neon lamp source 33 and the fringe patterns, i.e., fringe counts, $N_{laser}$, for the two-beam interference pattern from the laser source 32.

A correlation exists between the wavelength of and fringe counts from the laser based interference pattern and the wavelength of and fringe counts from the neon lamp based interference pattern. The number of fringes N is equal to the length L of the scan divided by the wavelength A of the source, i.e., $N_{lamp}=L/\lambda_{lamp}$ and $N_{laser}=L/\lambda_{laser}$. The ratio of the fringe counts is then equal to the inverse ratio of the wavelengths $\lambda$, i.e. $N_{lamp}/N_{laser}=\lambda_{laser}/\lambda_{lamp}$. Since the wavelength of the filtered neon lamp is known, and the number of fringes for both sources can be determined, the wavelength of the metrology laser can be determined from the relationship $\lambda_{laser}=\lambda_{lamp}N_{lamp}/N_{laser}$. Knowledge of the wavelength of the metrology laser 32 can be used either to adjust the operating parameters, i.e., current or temperature, of the metrology laser to bring its output wavelength to a nominal stabilized value, or send this data as auxiliary data with the interferograms to calibrate the wavenumber scale for measurement of the power spectrum density data.

Depending on the stability required and the intrinsic stability of the laser source, the calibration scan can be performed at suitable repetition rates. The resolution of this wavelength measurement depends on the length of the interferogram and on the counting mechanism. For one count per fringe, the resolution is given by a one count difference as follows:

$$\text{resolution} = \Delta\sigma$$
$$= N_{laser}\frac{\sigma_{lamp}}{N_{lamp}} - (N_{laser}-1)\frac{\sigma_{lamp}}{N_{lamp}}$$
$$= \frac{1}{OPD}$$

Where $\sigma_{lamp}$ is the wavenumber of the lamp which is equal to one over the wavelength $(1/\lambda)_{LAMP}$, and OPD is the optical path difference between two path lengths of the split lamp radiation beam.

For an existing space capable interferometer, i.e., dynamically aligned porch swing (DAPS), the OPD is preferably 2 cm, giving a resolution of 0.5 cm$^{-1}$ corresponding to a frequency of 15 GHz. For a given OPD, it is possible to increase the resolution $\Delta\sigma$ by implementing some kind of interpolation. In DAPS, there is directly a factor of four implemented using "fringe" and "dephase" signals from the metrology laser. With "fringe" and "dephase" signals the precision or resolution is then increased to 0.125 cm$^{-1}$ (3.75 GHz). If more resolution is needed, interpolation using a timer can be implemented. Fringe and dephase beam signals are discussed in greater detail in conjunction with FIG. 4 herein below.

In DAPS using a laser diode at 852 nanometers, to get 0.1 cm$^{-1}$ of certitude at 3000 cm$^{-1}$, one needs a metrology source stability within $3\times10^{-5}$ between calibration measurements. The resolution on the calibration measurement of the metrology source should be better than 0.35 cm$^{-1}$ (10.5 GHz). Since the actual DAPS configuration already gives 0.125 cm$^{-1}$ (3.75 GHz) of resolution, this technique can be successfully implemented to get as low as $1\times10^{-5}$ of frequency stability on the metrology laser.

Figure 4:
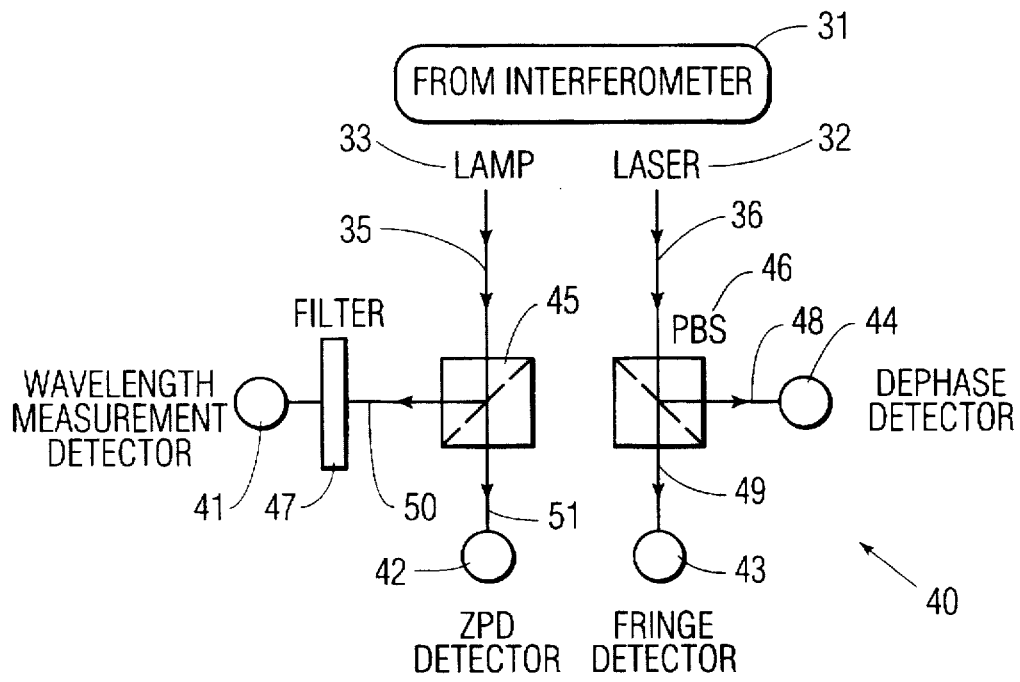
FIG. 4 is a schematic of an FTIR interferometer based spectrometer using a neon lamp as a calibration reference and zero path difference (ZPD) locator in accordance with the present invention.

Referring now to FIG. 4 there is shown a schematic 40 of an arrangement in accordance with the present invention for measuring the wavelength of the metrology source and determining the zero path distance (ZPD) location. Arriving from the interferometer, the laser based interference pattern 36 from the coherent radiant source, i.e., the laser source 33, impinges a polarization beamsplitter (PBS) 46 which splits the laser based interference pattern 36 into two distinct radiation beam signals, a fringe signal 49 and a dephase signal 48. The dephase signal 48, which is in quadrature with the fringe signal 49, impinges the dephase detector 44. The dephase signal 48 is utilized to determine the directional movement of the interferometer 31. The fringe signal 49, which impinges a fringe detector 43, is utilized to determine the fringe count of the laser beam 36. Preferably, each detector, the fringe detector 43 and dephase detector 44, is an optical based silicon type detector with a spectral response broad enough to cover the range of interest in the electromagnetic spectrum. The configuration and operating characteristics of optical based silicon type detectors are well known in the art and need not be explained in great detail herein.

Still referring to FIG. 4, arriving from the interferometer 31, the lamp based interference pattern 35 from the radiant neon lamp source 33 impinges a nonpolarizing beam splitter 45 that splits the lamp based interference pattern 35 into two beam signals comprising a fringe signal 50 which is passed through a filter 47 and impinges a fringe detector 41, and a ZPD signal 51 which impinges a zero path difference (ZPD) detector. The filter 47 operates to pass through to the fringe detector a preselected spectral line in the neon lamp based interference pattern 35 which is of interest due to preferred power and line shape characteristics. In the preferred embodiment of the present invention, the filter 47 passes a spectral line at 703 nanometers characterized by a clearly narrow line shape with discernable power output, i.e., FIG. 2. The narrow spectral line passed by the filter 47 impinges the fringe detector 41 to facilitate measuring the wavelength of the coherent radiant source, i.e., laser, in accordance with the correlation properties, noted above, between fringe counts and wavelength for the laser based interference pattern 36 and the neon lamp based interference pattern 35. The other beam 51 split off by the polarization beamsplitter is directed to the ZPD detector 42 to determine the zero path difference location of the two beam interference transmission from the interferometer 31. The zero path difference location is utilized by the interferometer 31 at each start up to assure that the optical paths traced by the neon lamp interference is identical for all measurement instances. Lack of filtering on the beam impinging the ZPD detector 42 provides a broadband, two beam interference signal which improves the zero path difference location detection. Thus, the nonfiltered interferogram, i.e. nonfiltered interference pattern, from the neon lamp is used to find the ZPD location, while the filtered interferogram, i.e., filtered interference pattern, from the neon lamp is used to calculate the wavelength of the laser 33.

There are reasons for not using the neon lamp solely as the metrology radiant source. First, the spectral power output from the neon lamp is low, and in a system like DAPS such low spectral power output is insufficient for spectrometer operations. Second, the neon lamp has an operating life expectancy less than that of a laser diode. In the arrangement of FIG. 3, to extend the usable life of the neon lamp, the neon lamp activation time is minimized by only turning on the neon lamp as required.

It should be understood that the embodiment described herein is merely exemplary and that a person skilled in the art may make many variations and modifications to this embodiment utilizing functionally equivalent elements to those described herein. For example, knowledge of the wavelength of the neon lamp is not limited to the values or accuracy disclosed herein, rather, the wavelength must be known to a very high degree of accuracy to permit correlation with a similar degree of accuracy to the wavelength of the metrology laser and permit accurate calibration of the spectral data acquired. Any and all such variations or modifications as well as others which may become apparent to those skilled in the art, are intended to be included within the scope of the invention as defined by the appended claims.

What is claimed is:

1. A method for determining the wavelength of a coherent radiant metrology source, incident to an interferometer for calibrating spectral data obtained with an interferometer based Fourier transform spectrometer, in combination therewith the improvement comprising the steps of:

directing into the interferometer a noncoherent radiant beam of known wavelength from a neon lamp exhibiting a predetermined spectral line;

creating with the interferometer a distinct interference pattern from each said coherent radiant metrology source and said neon lamp;

determining a distinct fringe pattern in each said distinct interference pattern; and, deriving the wavelength of said coherent radiant metrology source from said known wavelength of said neon lamp and each said distinct fringe pattern.

2. The method in accordance with claim 1, wherein said step of creating said distinct interference pattern from each said coherent radiant metrology source and said neon lamp includes directing a distinct radiant beam from each said coherent radiant metrology source and said neon lamp in a distinct predetermined optical path, said distinct predetermined optical path for said radiant beam from said neon lamp being parallel to said distinct predetermined optical path for said radiant beam from said coherent radiant metrology source.

3. The method in accordance with claim 1, wherein said distinct fringe pattern is the number of fringe counts from an interferogram generated from said interference pattern.

4. The method in accordance with claim 1, further including the step of separating said distinct interference pattern from said neon lamp into a fringe signal and a zero path difference location signal.

5. The method in accordance with claim 4, further including the step of utilizing the zero path difference location at each startup of the interferometer.

6. The method in accordance with claim 4, further including the step of directing said fringe signal through a filter to pass from said fringe signal a predetermined spectral line at a predetermined wavelength.

7. The method in accordance with claim 1, further including the step of separating said distinct interference pattern from said coherent radiant source into a fringe signal and a dephase signal.

8. The method in accordance with claim 7, further including the step of utilizing said dephase signal to determine the directional movement of the interferometer.

9. A method for determining the wavelength of a coherent radiant metrology source utilized in an interferometer based Fourier transform spectrometer for calibrating spectral data, said method comprising the steps of:

directing a first radiant beam from said coherent radiant metrology source into a predetermined optical path in the interferometer to split said first radiant beam to create a coherent radiant metrology source based interference pattern;

directing a noncoherent second radiant beam of known wavelength from a neon lamp exhibiting a predetermined spectral line into a second predetermined optical path in the interferometer to split said second radiant beam to create a neon lamp based interference pattern, said second predetermined optical path being parallel to said first predetermined optical path;

determining a coherent radiant metrology source based fringe pattern from said coherent radiant metrology source based interference pattern;

determining a neon lamp based fringe pattern from said neon lamp based interference pattern;

deriving the wavelength of said coherent radiant metrology source based on said known wavelength of said radiant beam from said neon lamp, said coherent radiant source based fringe pattern and said neon lamp based fringe pattern.

10. The method in accordance with claim 9, further including the step of separating said neon lamp interference pattern into a fringe signal and a zero path difference location signal.

11. The method in accordance with claim 10, wherein said step of separating said neon lamp based interference pattern is accomplished with a polarization beamsplitter.

12. The method in accordance with claim 10, further including the step of directing said fringe signal through a filter so as to pass from said fringe signal a predetermined spectral line.

13. The method in accordance with claim 10, further including the step of utilizing the determined zero path difference location at each startup of the interferometer.

14. The method in accordance with claim 9, further including the step of separating said coherent radiant source based interference pattern into a fringe signal and a dephase signal.

15. The method in accordance with claim 14, further including the step of utilizing said dephase signal to determine the directional movement of the interferometer.

16. The method in accordance with claim 14, wherein said fringe signal is utilized to determine said fringe pattern in said coherent radiant source based interference pattern.

17. The method in accordance with claim 9, wherein a correlation between the known wavelength of and fringe counts derived from said neon lamp based fringe pattern and the unknown wavelength of and fringe counts derived from said coherent radiant metrology source based fringe pattern is utilized to determine said unknown wavelength of said coherent radiant metrology source.

18. A method for calibrating power spectral data obtained with an interferometer based Fourier transform spectrometer, utilizing a laser source as the metrology source, comprising the steps of:

creating a laser based interference pattern from directing a radiant beam from said laser source into a first predetermined optical path system in the interferometer;

creating a neon lamp based interference pattern from directing a radiant beam of known wavelength from a neon lamp into a second predetermined optical path system in the interferometer, said second predetermined optical path system paralleling said first predetermined optical path system;

determining a laser based fringe pattern from said laser based interference pattern;

determining a neon lamp based fringe pattern from said neon lamp based interference pattern;

deriving the wavelength of said laser source from the known wavelength of said radiant beam from said neon lamp, said neon lamp based fringe pattern and said laser based fringe pattern; and calibrating the scale of the power spectral data based on the derived wavelength of said laser source.

19. The method according to claim 18, wherein said neon lamp which exhibits a predetermined spectral line.

20. The method in accordance with claim 18, further including the step of utilizing the derived wavelength of said laser source to stabilize the wavelength of said laser source at a predetermined wavelength.

21. The method in accordance with claim 18, further including the step of separating said laser based interference pattern into a dephase signal and a fringe signal, said dephase signal in quadrature with said fringe signal in phase.

22. The method in accordance with claim 21, wherein said step of separating said laser based interference pattern is accomplished by directing said laser based interference pattern through a polarization beamsplitter.

23. The method in accordance with claim 21, further including the step of utilizing said dephase signal to determine the directional movement of the interferometer.

24. The method in accordance with claim 18, further including the step of separating said neon lamp based interference pattern into a signal for determining the zero path difference location and a fringe signal utilized to determine said neon lamp based fringe pattern.

25. The method in accordance with claim 24, further including the step of utilizing the determined zero path difference location at each startup of the interferometer.

26. The method in accordance with claim 24, wherein said fringe signal is directed from said secondary radiant source through a filter to pass a spectral line occurring at a predetermined wavelength.

27. The method in accordance with claim 26, wherein said spectral line exhibits a predetermined line shape and said predetermined wavelength is 703 nanometers.

28. The method according to claim 18, wherein said step of calibrating the scale includes deriving a wavenumber scale for the Fourier transform spectrometer.

* * * * *